United States Patent
Matsushita et al.

(10) Patent No.: US 8,170,707 B2
(45) Date of Patent: May 1, 2012

(54) FAILURE DETECTING METHOD, FAILURE DETECTING APPARATUS, AND SEMICONDUCTOR DEVICE MANUFACTURING METHOD

(75) Inventors: Hiroshi Matsushita, Hiratsuka (JP); Kenichi Kadota, Yokohama (JP); Toshiyuki Aritake, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 658 days.

(21) Appl. No.: 12/256,265

(22) Filed: Oct. 22, 2008

(65) Prior Publication Data
US 2009/0117673 A1 May 7, 2009

(30) Foreign Application Priority Data

Oct. 30, 2007 (JP) .................................. 2007-281490

(51) Int. Cl.
*G06F 19/00* (2011.01)
(52) U.S. Cl. ........................... 700/121; 700/21; 700/110
(58) Field of Classification Search ..................... 700/21, 700/79, 108–110, 121
See application file for complete search history.

(56) References Cited

U.S. PATENT DOCUMENTS

| 7,043,384 | B2 | 5/2006 | Matsushita et al. |
| 7,221,991 | B2 | 5/2007 | Matsushita et al. |
| 7,222,026 | B2 | 5/2007 | Matsushita et al. |
| 7,405,088 | B2 | 7/2008 | Matsushita et al. |
| 7,881,520 | B2 * | 2/2011 | Ueno et al. ..................... 382/149 |
| 2002/0081756 | A1 * | 6/2002 | Asahina et al. .................. 438/14 |
| 2004/0047500 | A1 * | 3/2004 | Taguchi et al. ................ 382/149 |
| 2006/0281199 | A1 | 12/2006 | Matsushita |
| 2008/0024773 | A1 * | 1/2008 | Miyazaki et al. .......... 356/237.2 |

FOREIGN PATENT DOCUMENTS

JP 2005-236094 9/2005

* cited by examiner

*Primary Examiner* — Kakali Chaki
*Assistant Examiner* — Nathan Laughlin
(74) *Attorney, Agent, or Firm* — Finnegan, Henderson, Farabow, Garrett & Dunner, L.L.P.

(57) ABSTRACT

A method for inputting a foreign substance inspection map created by foreign substance inspection for a wafer surface after each processing process in a wafer processing process, inputting a die sort map created by a die sort test after the wafer processing process, setting region segments in the wafer, setting a region number for each segment, calculating foreign substance density of the region segments, based on the foreign substance inspection map, and plotting the foreign substance density, using the region numbers, to calculate a foreign substance inspection map waveform characteristic amount, calculating failure density in the region segments, based on the die sort map, and plotting the failure density, using the region numbers, to calculate a die sort map waveform characteristic amount, calculating similarity between the foreign substance inspection map waveform characteristic amount and the die sort map waveform characteristic amount, and identifying a processing process cause of failure occurrence.

9 Claims, 8 Drawing Sheets

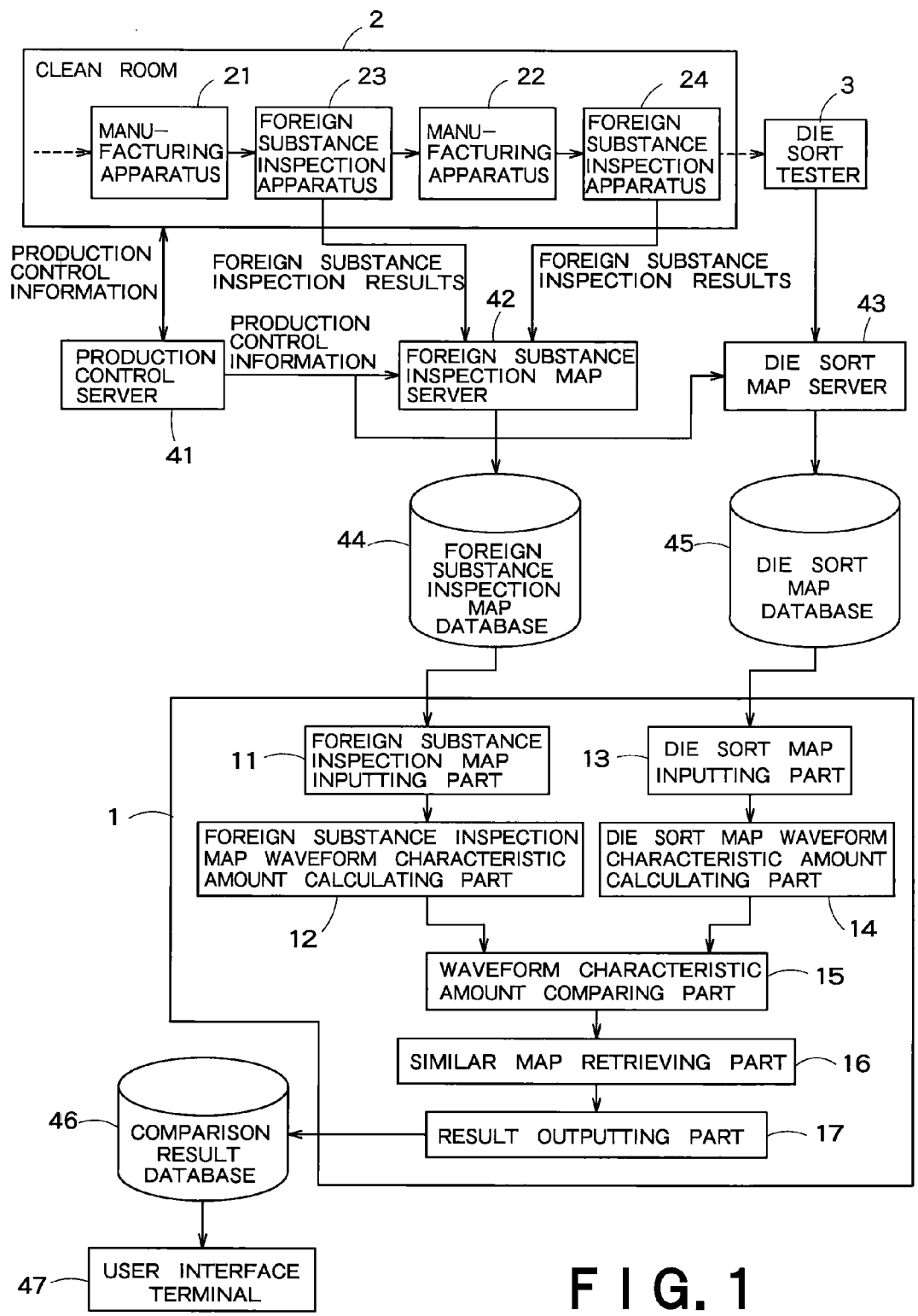
F I G. 1

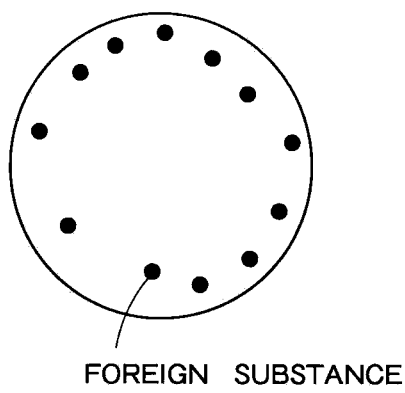
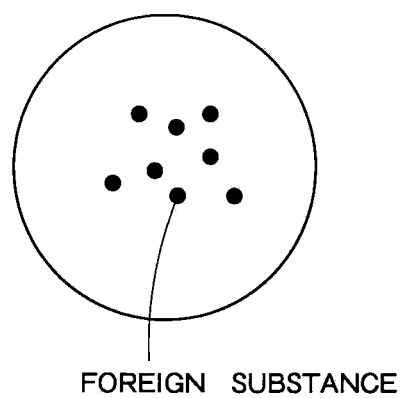
F I G. 2A  F I G. 2B
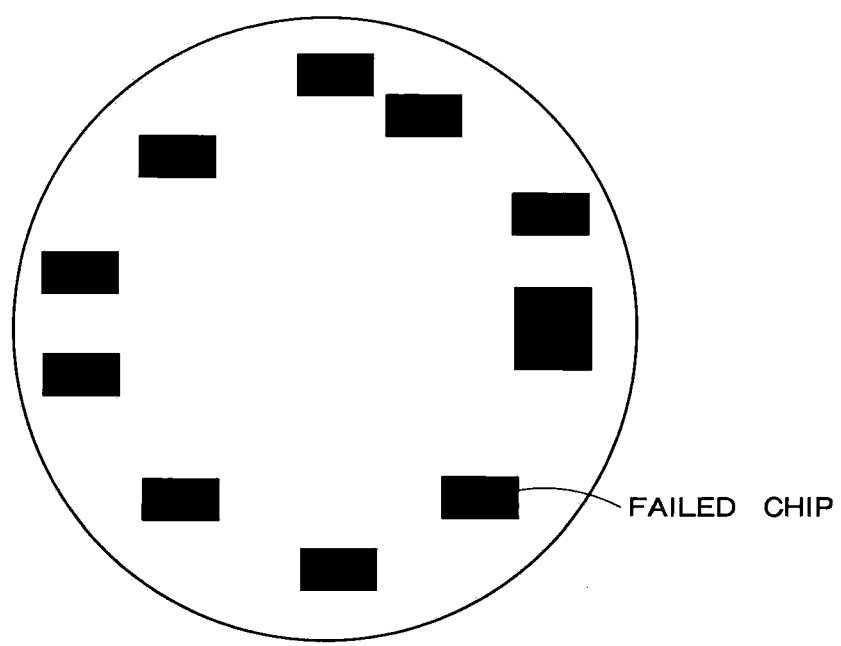
F I G. 3

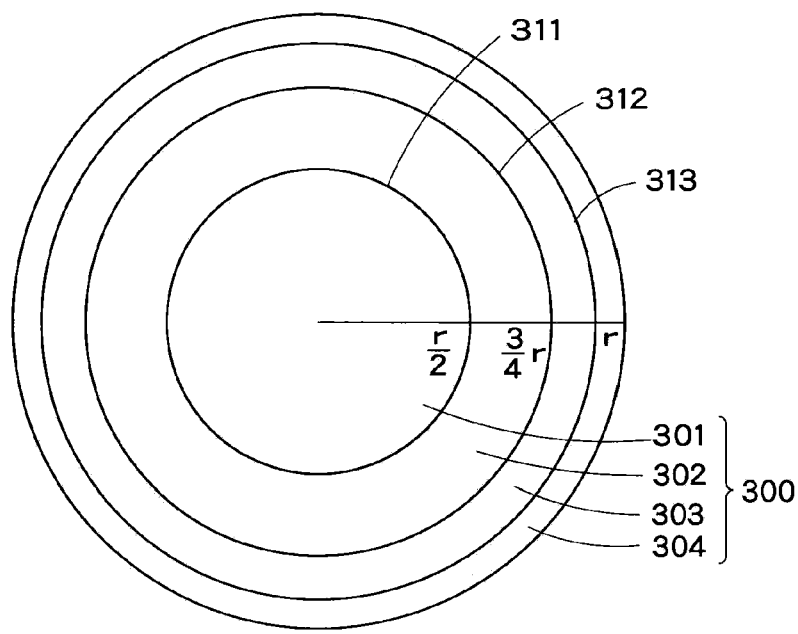
F I G. 4
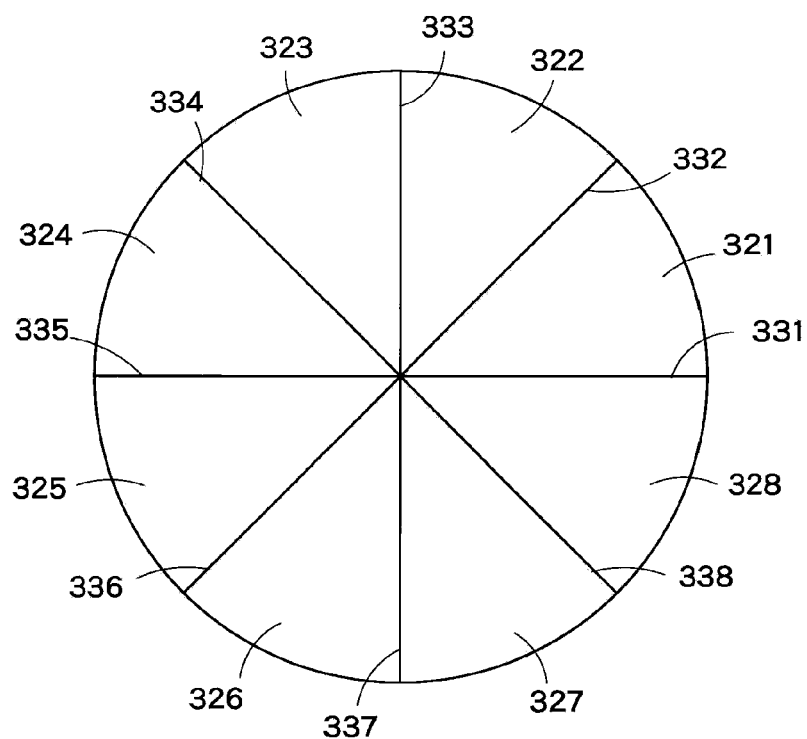
F I G. 5

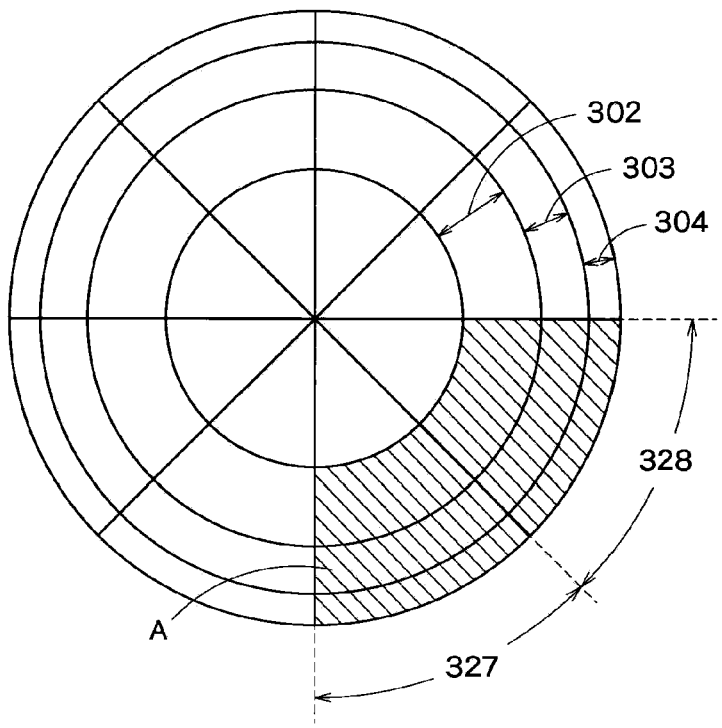
F I G. 6
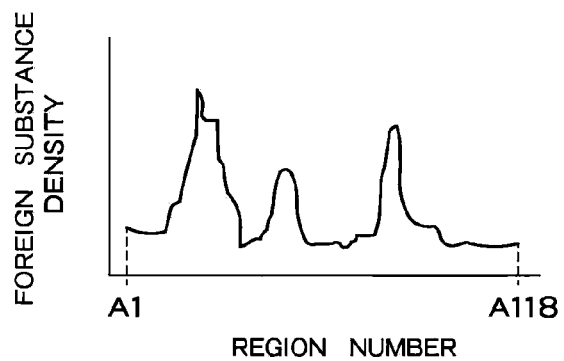
F I G. 7A
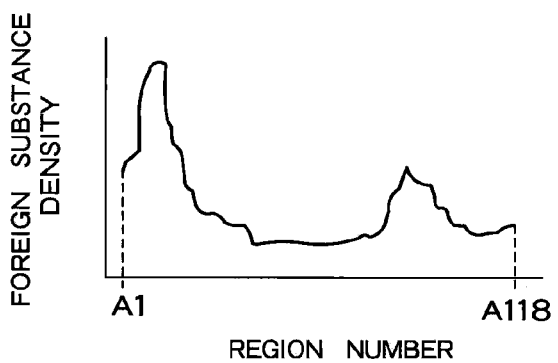
F I G. 7B

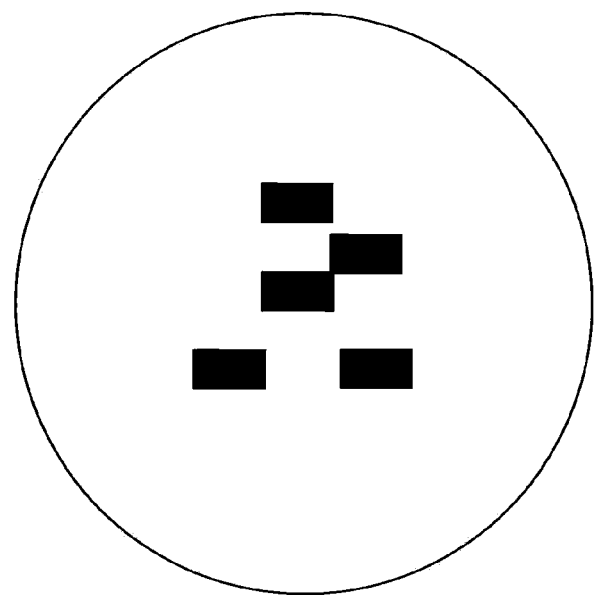
F I G. 10
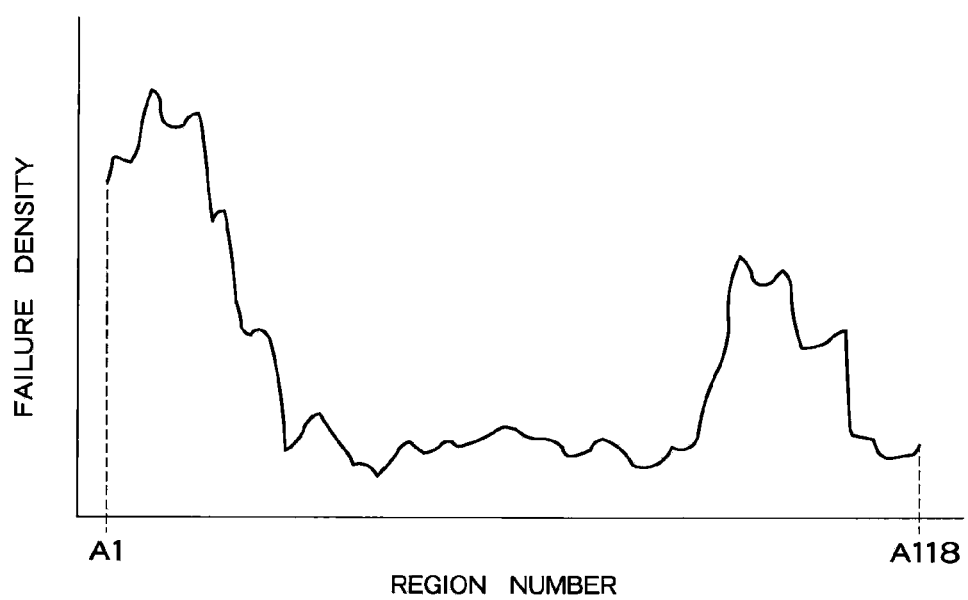
F I G. 11

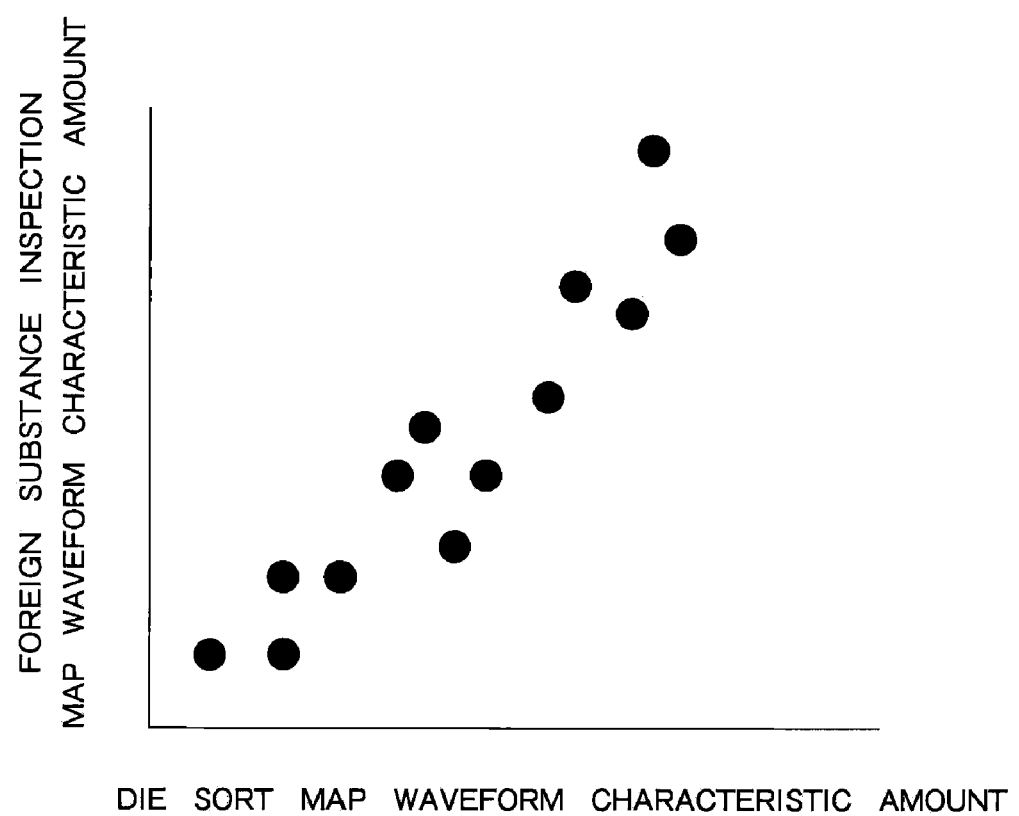
F I G. 12

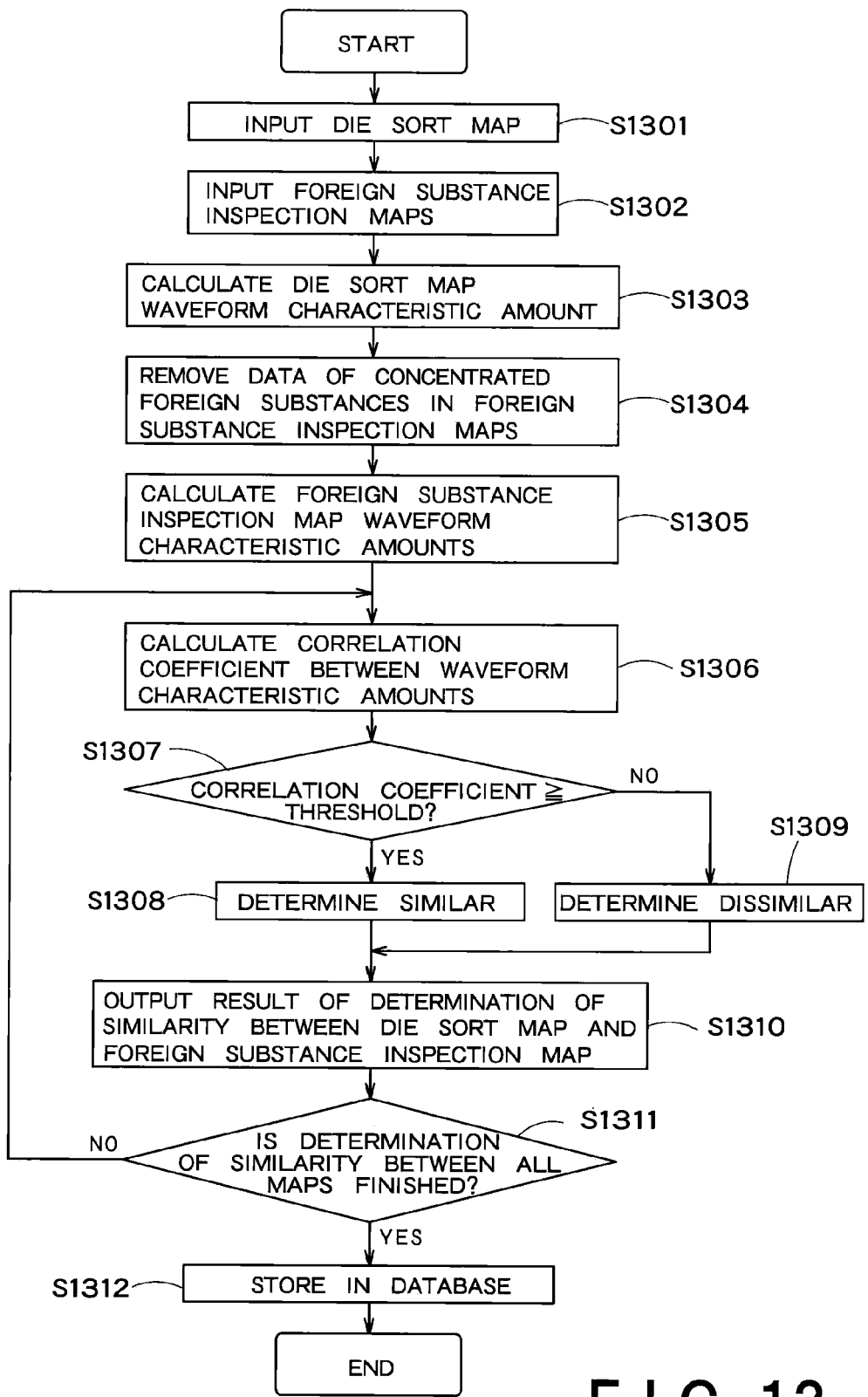
F I G. 13

FAILURE DETECTING METHOD, FAILURE DETECTING APPARATUS, AND SEMICONDUCTOR DEVICE MANUFACTURING METHOD

CROSS REFERENCE TO RELATED APPLICATION

This application is based upon and claims benefit of priority from the Japanese Patent Application No. 2007-281490, filed on Oct. 30, 2007, the entire contents of which are incorporated herein by reference.

BACKGROUND OF THE INVENTION

The present invention relates to a failure detecting method, a failure detecting apparatus, and a semiconductor device manufacturing method.

In order to improve the yield of LSI manufacturing, it is important to analyze the yield loss, early clarify the process, manufacturing apparatus, or design condition that is the cause of the yield loss, and improve it. However, since an LSI is produced through several hundred steps and manufacturing apparatuses, identifying the cause of LSI failures is very difficult work.

For the clarification of the cause of failures, the results of an electrical property test (a die sort test) that is performed after the wafer process is finished may be used. The die sort test includes, for example, a DC test for examining the current consumption of an integrated circuit, a function test for confirming the desired operation of an integrated circuit, and a margin test for checking the allowable operation range of an integrated circuit.

This die sort test is performed with the wafer in a round shape, and the test results are mapped and displayed at positions in the wafer surface. For example, for a memory product, such as a DRAM, the test results are expressed by an FBM (Fail Bit Map). Also, a pass/fail map in which a pass or fail per chip is mapped and displayed is obtained.

Failure distribution in the wafer surface is largely divided into two types, random failures evenly distributed without depending on the position on the wafer surface, and clustering failures causing unbalance somewhere. Among these, for the clustering failures, the factor of the clustering failures is often due to a process, a manufacturing apparatus, and the like, and the clustering failures are a great cause of yield decrease.

It is indicated that failures caused by a process and a manufacturing apparatus leave "a fingerprint" as failure distribution on the wafer surface. In other words, if a problem occurs in a certain process and manufacturing apparatus, clustering failures specific to the process and manufacturing apparatus occur. In this sense, it can be said that classifying the clustering failures is a clue to the clarification of the cause of failures.

A failure analyzing method is proposed in which the processing process that is the cause of failure occurrence is identified by performing appearance inspection after each processing process in a wafer processing process to create a predicted probe inspection map considering that a chip corresponding to a place where a defect is detected will be a failed chip, performing probe inspection after the wafer processing process to perform pass/fail determination for each chip to create a probe inspection map, and extracting the predicted probe inspection map matching or similar to the probe inspection map (see, for example, Japanese Patent Laid-Open No. 2005-236094).

However, since not all chips corresponding to the places where a defect is present are failed, it is difficult to identify the processing process that is the cause of failure occurrence by comparison of the predicted probe inspection map and the probe inspection map.

It is desired to automatically and efficiently detect the similarity between wafer maps in different data forms, such as the results of the test (the die sort test) after the wafer processing process and the results of the appearance inspection after each processing process, and early identify the cause of failures with good precision.

SUMMARY OF THE INVENTION

According to one aspect of the present invention, there is provided a failure detecting method comprising:

inputting a foreign substance inspection map created by foreign substance inspection for a wafer surface after each processing process in a wafer processing process;

inputting a die sort map created by a die sort test after the wafer processing process;

setting a plurality of region segments in the wafer;

setting a region number for each of the region segments;

calculating foreign substance density in each of the region segments, based on the foreign substance inspection map, and plotting the foreign substance density, using the region numbers, to calculate a foreign substance inspection map waveform characteristic amount;

calculating failure density in each of the region segments, based on the die sort map, and plotting the failure density, using the region numbers, to calculate a die sort map waveform characteristic amount;

calculating similarity between the foreign substance inspection map waveform characteristic amount and the die sort map waveform characteristic amount; and identifying a processing process that is a cause of failure occurrence, based on the similarity.

According to one aspect of the present invention, there is provided a failure detecting apparatus comprising:

a foreign substance inspection map inputting part provided with a foreign substance inspection map created by foreign substance inspection for a wafer surface after each processing process in a wafer processing process;

a die sort map inputting part provided with a die sort map created by a die sort test after the wafer processing process;

a foreign substance inspection map waveform characteristic amount calculating part which sets a plurality of region segments in the wafer, sets a region number for each of the region segments, calculates foreign substance density in each of the region segments, based on the foreign substance inspection map, and plots the foreign substance density, using the region numbers, to calculate a foreign substance inspection map waveform characteristic amount;

a die sort map waveform characteristic amount calculating part which sets in the wafer the same region segments and region numbers as the region segments and the region numbers set by the foreign substance inspection map waveform characteristic amount calculating part, calculates failure density in each of the region segments, based on the die sort map, and plots the failure density, using the region numbers, to calculate a die sort map waveform characteristic amount;

a waveform characteristic amount comparing part which calculates similarity between the foreign substance inspection map waveform characteristic amount and the die sort map waveform characteristic amount; and a similar map retrieving part which detects the foreign substance inspection map waveform characteristic amount similar to the die sort map waveform characteristic amount, based on the similarity.

According to one aspect of the present invention, there is provided a semiconductor device manufacturing method comprising:

performing foreign substance inspection for a surface of a wafer after each processing process in a wafer processing process to create a foreign substance inspection map;

performing a die sort test after the wafer processing process to create a die sort map;

setting a plurality of region segments in the wafer;

setting a region number for each of the region segments;

calculating foreign substance density in each of the region segments, based on the foreign substance inspection map, and plotting the foreign substance density, using the region numbers, to calculate a foreign substance inspection map waveform characteristic amount;

calculating failure density in each of the region segments, based on the die sort map, and plotting the failure density, using the region numbers, to calculate a die sort map waveform characteristic amount;

calculating similarity between the foreign substance inspection map waveform characteristic amount and the die sort map waveform characteristic amount; and identifying a processing process that is a cause of failure occurrence, based on the similarity.

BRIEF DESCRIPTION OF THE DRAWINGS

FIG. 1 is a schematic configuration view of a semiconductor manufacturing system including a failure detecting apparatus according to an embodiment of the present invention;

FIG. 2A is a view showing one example of a foreign substance inspection map;

FIG. 2B is a view showing one example of a foreign substance inspection map;

FIG. 3 is a view showing one example of a die sort map;

FIG. 4 is a view explaining one example of region segments in the radial direction;

FIG. 5 is a view explaining one example of region segments in the central angle direction;

FIG. 6 is a view explaining region segments in which FIG. 4 and FIG. 5 are combined;

FIG. 7A is a view showing one example of a foreign substance inspection map waveform characteristic amount;

FIG. 7B is a view showing one example of a foreign substance inspection map waveform characteristic amount;

FIG. 10 is a view showing one example of a die sort map;

FIG. 11 is a view showing one example of the die sort map waveform characteristic amount;

FIG. 12 is a graph showing one example of the display of a scatter diagram of the die sort map waveform characteristic amount and the foreign substance inspection map waveform characteristic amount; and FIG. 13 is a flow chart of a failure detecting method according to the same embodiment.

DESCRIPTION OF THE EMBODIMENTS

Figure 8:
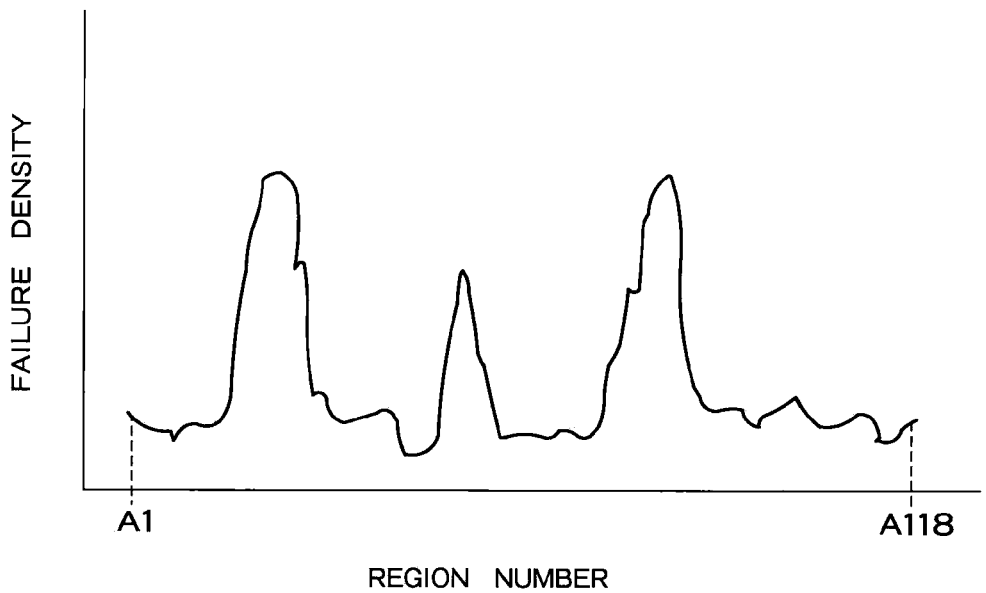
FIG. 8 is a view showing one example of a die sort map waveform characteristic amount.

An embodiment of the present invention will be described below with reference to the drawings.

A schematic configuration of a semiconductor manufacturing system including a failure detecting apparatus 1 according to the embodiment of the present invention is shown in FIG. 1. The inspection of a wafer surface is performed by foreign substance inspecting apparatuses 23 and 24 after wafer processing processes performed by manufacturing apparatuses 21 and 22 in a clean room 2. This inspection is performed optically or with an electron beam, and foreign substances, such as dust and electrical wiring pattern abnormality, are detected.

As a result of the inspection, foreign substance inspection maps in which the locations of foreign substances are mapped and displayed on a wafer surface are created, and stored in a foreign substance inspection map database 44 via a foreign substance inspection map server 42. For example, a foreign substance inspection map as shown in FIG. 2A is output from the foreign substance inspecting apparatus 23, and a foreign substance inspection map as shown in FIG. 2B is output from the foreign substance inspecting apparatus 24.

After all wafer processing processes in the clean room 2 are finished, a die sort test (an electrical property test) is performed by a die sort tester 3, and failed chips are detected. As a result of the die sort test, a die sort map in which failed chips in the wafer are mapped and displayed is created, and stored in a die sort map database 45 via a die sort map server 43. One example of the die sort map is shown in FIG. 3.

A production control server 41 performs the communication of production control information with the clean room 2. Also, the production control server 41 outputs the production control information to the foreign substance inspection map server 42 and the die sort map server 43. The foreign substance inspection map server 42 and the die sort map server 43 operate based on the production control information.

The failure detecting apparatus 1 performs the identification of the processing process that is the cause of failure occurrence, using the foreign substance inspection maps and the die sort map. The failure detecting apparatus 1 includes a foreign substance inspection map inputting part 11, a foreign substance inspection map waveform characteristic amount calculating part 12, a die sort map inputting part 13, a die sort map waveform characteristic amount calculating part 14, a waveform characteristic amount comparing part 15, a similar map retrieving part 16, and a result outputting part 17.

The foreign substance inspection map inputting part 11 fetches, from the foreign substance inspection map database 44, the foreign substance inspection map created by the foreign substance inspection that is performed after each of the plurality of wafer processing processes is finished, and the foreign substance inspection map inputting part 11 outputs the foreign substance inspection map to the foreign substance inspection map waveform characteristic amount calculating part 12.

The foreign substance inspection map waveform characteristic amount calculating part 12 divides the wafer into a plurality of region segments. As shown in FIG. 4, when the radius of the wafer is "r", a wafer display region 300 is divided into four regions, one circular region 301 and three ring-shaped regions 302 to 304, by a borderline 311 provided at a distance of r/2 in the radial direction from the center of the wafer, a borderline 312 provided at a distance of 3r/4 in the radial direction, and a borderline 313 provided in the edge part of the wafer.

Also, as shown in FIG. 5, the wafer display region 300 is divided into eight fan-shaped regions 321 to 328 by eight borderlines 331 to 338 segmenting the wafer display region 300 for each 45° in the central angle direction.

As shown in FIG. 6, the region segments in FIG. 4 and FIG. 5 are combined to define 118 region segments in total. For example, a region A can be defined as the product region (logical product) of the regions 302 to 304 outside r/2 in the radial direction and the regions 327 and 328 at 270° to 360° in the angle direction.

The foreign substance inspection map waveform characteristic amount calculating part 12 counts the number of foreign substances in each of the 118 region segments and divides the number of foreign substances by the area of the region to calculate foreign substance density. When region numbers A1 to A118 are given to the 118 region segments, and the foreign substance density is shown as a graph, the foreign substance density is shown like a waveform. This is called a foreign substance inspection map waveform characteristic amount.

If many foreign substances are locally present in the foreign substance inspection map, the presence of these foreign substances greatly affects the shape of the waveform characteristic amount. Therefore, each region segment is divided into a plurality of micro-regions, and when two or more foreign substances are present in one micro-region, processing for changing to one foreign substance is performed. For example, a plurality of chip forming regions present in each of the 118 region segments are each divided like a 20×20 mesh.

Thus, for example, a foreign substance inspection map waveform characteristic amount as shown in FIG. 7A is obtained from the foreign substance inspection map shown in FIG. 2A, and a foreign substance inspection map waveform characteristic amount as shown in FIG. 7B is obtained from the foreign substance inspection map shown in FIG. 2B.

The foreign substance inspection map waveform characteristic amount calculating part 12 calculates the foreign substance inspection map waveform characteristic amount for each of the plurality of foreign substance inspection maps and outputs the foreign substance inspection map waveform characteristic amount to the waveform characteristic amount comparing part 15.

The die sort map inputting part 13 fetches the die sort map from the die sort map database 45 and outputs the die sort map to the die sort map waveform characteristic amount calculating part 14.

The die sort map waveform characteristic amount calculating part 14 divides the wafer into 118 region segments as in those shown in FIG. 4 to FIG. 6. Then, the die sort map waveform characteristic amount calculating part 14 counts the number of failed chips in each region segment and divides the number of failed chips in the region segment by the number of all chips to calculate failure density.

The die sort map waveform characteristic amount calculating part 14 gives region numbers A1 to A118 to the 118 region segments similarly to the foreign substance inspection map waveform characteristic amount calculating part 12. Then, when the failure density is shown as a graph, the failure density is shown like a waveform. This is called a die sort map waveform characteristic amount.

Thus, for example, a die sort map waveform characteristic amount as shown in FIG. 8 is obtained from the die sort map shown in FIG. 3. The die sort map waveform characteristic amount calculating part 14 outputs the calculated die sort map waveform characteristic amount to the waveform characteristic amount comparing part 15.

Figure 9:
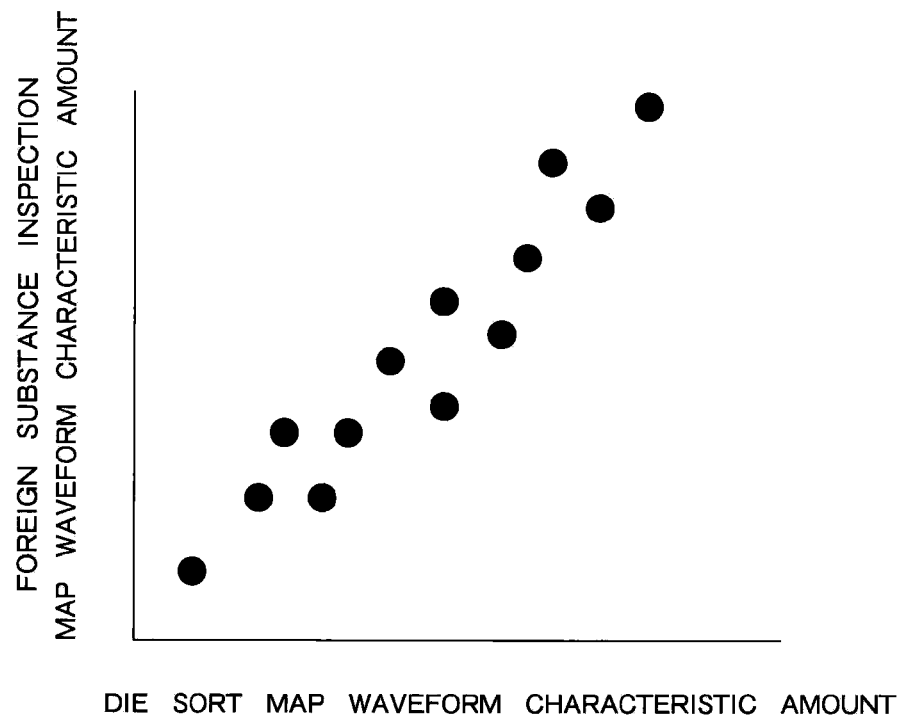
FIG. 9 is a graph showing one example of the display of a scatter diagram of the die sort map waveform characteristic amount and the foreign substance inspection map waveform characteristic amount.

The waveform characteristic amount comparing part 15 compares the die sort map waveform characteristic amount and each of the plurality of foreign substance inspection map waveform characteristic amounts and calculates similarity. For example, the waveform characteristic amount comparing part 15 displays the die sort map waveform characteristic amount shown in FIG. 8 and the foreign substance inspection map waveform characteristic amount shown in FIG. 7A as a scatter diagram, as shown in FIG. 9, and calculates a correlation coefficient as similarity. The correlation coefficient (defined as "c") can be obtained using a die sort map waveform characteristic amount "X" and a foreign substance inspection map waveform characteristic amount "Y" by the following formula.

$$c = \frac{\sum_{i=1}^{118}(Xi - \overline{X})(Yi - \overline{Y})}{\sqrt{\sum_{i=1}^{118}(Xi - \overline{X})^2} \sqrt{\sum_{i=1}^{118}(Yi - \overline{Y})^2}}$$

where, Xi: the die sort map waveform characteristic amount "X" in region number Ai (i=1 to 118),
Yi: the foreign substance inspection map waveform characteristic amount "Y" in region number Ai (i=1 to 118),
$\overline{X}$: the average of the die sort map waveform characteristic amounts "X",
$\overline{Y}$: the average of the foreign substance inspection map waveform characteristic amounts "Y"

In the example shown in FIG. 9, the correlation coefficient is 0.81.

The similar map retrieving part 16 retrieves the foreign substance inspection map waveform characteristic amount similar to the die sort map waveform characteristic amount, based on the similarity calculated in the waveform characteristic amount comparing part 15. For example, when a correlation coefficient is used for similarity, whether being similar or not is determined by whether the correlation coefficient is equal to or more than a predetermined threshold or not. For example, the threshold is a value of 0.6 or more. As the threshold value increases, the foreign substance inspection map waveform characteristic amount with higher similarity is detected.

When the foreign substance inspection map waveform characteristic amount similar to the die sort map waveform characteristic amount is detected, it can be estimated that foreign substances shown in the foreign substance inspection map corresponding to the foreign substance inspection map waveform characteristic amount are the cause of chip failures.

For example, the chip failures shown in the die sort map in FIG. 3 are caused by the foreign substances shown in FIG. 2A, and it can be estimated that the cause of failures is in the manufacturing apparatus 21.

Also, for example, a die sort map as shown in FIG. 10 is obtained, and from this die sort map, a die sort map waveform characteristic amount as shown in FIG. 11 is calculated. When this die sort map waveform characteristic amount and the foreign substance inspection map waveform characteristic amount shown in FIG. 7B are displayed as a scatter diagram, the scatter diagram is as shown in FIG. 12, and the correlation coefficient is 0.9. Therefore, in this case, it can be estimated that the cause of failures is in the manufacturing apparatus 22.

The result of retrieval by the similar map retrieving part 16 is stored in a comparison result database 46 via the result outputting part 17. A user can confirm the cause of failures from a user interface terminal 47 connected to the comparison result database 46.

By performing measures against foreign substances in the wafer processing process corresponding to the foreign substance inspection map estimated to be the cause of failures, measures against the failures can be performed, and the yield can be improved.

When there is no foreign substance inspection map waveform characteristic amount similar to the die sort map waveform characteristic amount, it is considered that the chip failures are not caused by foreign substances, and other factors, such as dimension abnormality and film thickness abnormality, are searched.

A failure detecting method performed by such a failure detecting apparatus will be described using a flow chart shown in FIG. 13.

(Step S1301) The die sort map inputting part 13 fetches a die sort map from the die sort map database 45 and outputs the die sort map to the die sort map waveform characteristic amount calculating part 14. The die sort map waveform characteristic amount calculating part 14 is given the die sort map.

(Step S1302) The foreign substance inspection map inputting part 11 fetches a plurality of foreign substance inspection maps from the foreign substance inspection map database 44 and outputs the plurality of foreign substance inspection maps to the foreign substance inspection map waveform characteristic amount calculating part 12. The foreign substance inspection map waveform characteristic amount calculating part 12 is given the plurality of foreign substance inspection maps.

(Step S1303) The die sort map waveform characteristic amount calculating part 14 calculates a die sort map waveform characteristic amount. The die sort map waveform characteristic amount calculating part 14 outputs the calculated die sort map waveform characteristic amount to the waveform characteristic amount comparing part 15.

(Step S1304) The foreign substance inspection map waveform characteristic amount calculating part 12 removes locally concentrated foreign substances from the foreign substance inspection maps.

(Step S1305) The foreign substance inspection map waveform characteristic amount calculating part 12 calculates a foreign substance inspection map waveform characteristic amount for each of the plurality of foreign substance inspection maps. The foreign substance inspection map waveform characteristic amount calculating part 12 outputs the calculated foreign substance inspection map waveform characteristic amount to the waveform characteristic amount comparing part 15.

(Step S1306) The waveform characteristic amount comparing part 15 calculates the correlation coefficient (similarity) between the die sort map waveform characteristic amount and the foreign substance inspection map waveform characteristic amount.

(Step S1307) Whether the correlation coefficient is equal to or more than a threshold or not is determined. When the correlation coefficient is equal to or more than the threshold, the method proceeds to step S1308, and when the correlation coefficient is less than the threshold, the method proceeds to step S1309.

(Step S1308) It is determined that the die sort map (the die sort map waveform characteristic amount) and the foreign substance inspection map (the foreign substance inspection map waveform characteristic amount) are similar.

(Step S1309) It is determined that the die sort map (the die sort map waveform characteristic amount) and the foreign substance inspection map (the foreign substance inspection map waveform characteristic amount) are not similar.

(Step S1310) The result of determination of similarity between the die sort map and the foreign substance inspection map is output to the result outputting part 17.

(Step S1311) Whether the determination of similarity between the die sort map waveform characteristic amount and all foreign substance inspection map waveform characteristic amounts (the calculation of the correlation coefficient and the comparison of the correlation coefficient with the threshold) is finished is determined. When the determination of similarity is finished, the method proceeds to step S1312, and when the determination of similarity is not finished, the method returns to step S1306.

(Step S1312) The results of determination of similarity between the die sort map and the foreign substance inspection maps are stored in the comparison result database 46.

In this manner, in this embodiment, by converting the die sort map and the foreign substance inspection map into the common form of the waveform characteristic amount (the waveform shape), the comparison of similarity between those in different data forms can be performed. Therefore, the manufacturing step that is the cause of failures can be efficiently identified with good precision, and the yield can be improved.

While in the above embodiment, the comparison of the die sort map and the foreign substance inspection map is performed, data comparison can be performed by similarly converting other wafer map-like data, for example, values measured in the wafer surface, such as film thickness and dimensions, a fail bit map, and the property values of transistors in a TEG (Test Element Group), into the same form of the waveform characteristic amount.

What is claimed is:

1. A failure detecting method comprising:
inputting a foreign substance inspection map created by foreign substance inspection for a wafer surface after each processing process in a wafer processing process;
inputting a die sort map created by a die sort test after the wafer processing process;
setting a plurality of region segments in the wafer;
setting a region number for each of the region segments;
calculating foreign substance density in each of the region segments, based on the foreign substance inspection map, and plotting the foreign substance density, using the region numbers, to calculate a foreign substance inspection map waveform characteristic amount;
calculating failure density in each of the region segments, based on the die sort map, and plotting the failure density, using the region numbers, to calculate a die sort map waveform characteristic amount;
calculating similarity between the foreign substance inspection map waveform characteristic amount and the die sort map waveform characteristic amount; and
identifying a processing process that is a cause of failure occurrence, based on the similarity,
wherein a plurality of first regions, into which the wafer is divided in a radial direction, and a plurality of fan-shaped second regions, into which the wafer is divided in a central angle direction, are combined to set the plurality of region segments.

2. The failure detecting method according to claim 1, wherein the similarity is a correlation coefficient between the foreign substance inspection map waveform characteristic amount and the die sort map waveform characteristic amount.

3. The failure detecting method according to claim 1, wherein in calculation of the foreign substance density, the foreign substance density is calculated after each of the plurality of region segments are divided into a plurality of regions and a number of foreign substances in the region, where a plurality of foreign substances are present, is converted to one.

4. A computer comprising:
a foreign substance inspection map inputting part provided with a foreign substance inspection map created by foreign substance inspection for a wafer surface after each processing process in a wafer processing process;
a die sort map inputting part provided with a die sort map created by a die sort test after the wafer processing process;
a foreign substance inspection map waveform characteristic amount calculating part which sets a plurality of region segments in the wafer, sets a region number for each of the region segments, calculates foreign substance density in each of the region segments, based on the foreign substance inspection map, and plots the foreign substance density, using the region numbers, to calculate a foreign substance inspection map waveform characteristic amount;
a die sort map waveform characteristic amount calculating part which sets in the wafer the same region segments and region numbers as the region segments and the region numbers set by the foreign substance inspection map waveform characteristic amount calculating part, calculates failure density in each of the region segments, based on the die sort map, and plots the failure density, using the region numbers, to calculate a die sort map waveform characteristic amount;
a waveform characteristic amount comparing part which calculates similarity between the foreign substance inspection map waveform characteristic amount and the die sort map waveform characteristic amount; and
a similar map retrieving part which detects the foreign substance inspection map waveform characteristic amount similar to the die sort map waveform characteristic amount, based on the similarity,
wherein the foreign substance inspection map waveform characteristic amount calculating part combines a plurality of first regions, into which the wafer is divided in a radial direction, and a plurality of fan-shaped second regions, into which the wafer is divided in a central angle direction, to set the plurality of region segments.

5. The computer according to claim 4, wherein the waveform characteristic amount comparing part calculates a correlation coefficient between the foreign substance inspection map waveform characteristic amount and the die sort map waveform characteristic amount as the similarity, and wherein
the similar map retrieving part detects, as the foreign substance inspection map waveform characteristic amount similar to the die sort map waveform characteristic amount, the foreign substance inspection map waveform characteristic amount such that the correlation coefficient is equal to or more than a predetermined threshold.

6. The computer according to claim 4, wherein the foreign substance inspection map waveform characteristic amount calculating part divides each of the plurality of region segments into a plurality of regions and converts a number of foreign substances in the region, where a plurality of foreign substances are present, to one.

7. A semiconductor device manufacturing method comprising:
performing foreign substance inspection for a surface of a wafer after each processing process in a wafer processing process to create a foreign substance inspection map;
performing a die sort test after the wafer processing process to create a die sort map;
setting a plurality of region segments in the wafer;
setting a region number for each of the region segments;
calculating foreign substance density in each of the region segments, based on the foreign substance inspection map, and plotting the foreign substance density, using the region numbers, to calculate a foreign substance inspection map waveform characteristic amount;
calculating failure density in each of the region segments, based on the die sort map, and plotting the failure density, using the region numbers, to calculate a die sort map waveform characteristic amount;
calculating similarity between the foreign substance inspection map waveform characteristic amount and the die sort map waveform characteristic amount; and
identifying a processing process that is a cause of failure occurrence, based on the similarity,
wherein a plurality of first regions, into which the wafer is divided in a radial direction, and a plurality of fan-shaped second regions, into which the wafer is divided in a central angle direction, are combined to set the plurality of region segments.

8. The semiconductor device manufacturing method according to claim 7, wherein the similarity is a correlation coefficient between the foreign substance inspection map waveform characteristic amount and the die sort map waveform characteristic amount.

9. The semiconductor device manufacturing method according to claim 7, wherein in calculation of the foreign substance density, the foreign substance density is calculated after each of the plurality of region segments are divided into a plurality of regions and a number of foreign substances in the region, where a plurality of foreign substances are present, is converted to one.

* * * * *